(12) United States Patent
Tabor

(10) Patent No.: US 11,072,937 B1
(45) Date of Patent: Jul. 27, 2021

(54) INFLATABLE POOL DIVIDER

(71) Applicant: Britton Lemmon Tabor, Gastonia, NC (US)

(72) Inventor: Britton Lemmon Tabor, Gastonia, NC (US)

( * ) Notice: Subject to any disclaimer, the term of this patent is extended or adjusted under 35 U.S.C. 154(b) by 0 days.

(21) Appl. No.: 16/877,656

(22) Filed: May 19, 2020

(51) Int. Cl.
  *E04H 4/14* (2006.01)
  *F16G 11/12* (2006.01)

(52) U.S. Cl.
  CPC ............. *E04H 4/143* (2013.01); *F16G 11/12* (2013.01)

(58) Field of Classification Search
  CPC ......... E04H 4/143; E04H 4/145; F16G 11/12; Y02A 20/204; E02B 15/0864
  See application file for complete search history.

(56) References Cited

U.S. PATENT DOCUMENTS

| | | | | |
|---|---|---|---|---|
| 3,050,750 A * | 8/1962 | Harrison | .................... | E04H 4/06 441/136 |
| 7,172,367 B2 * | 2/2007 | Jeory | ...................... | E02B 15/08 405/63 |
| 9,487,926 B1 * | 11/2016 | Miller | .................. | E02B 15/0871 |
| 10,077,570 B2 * | 9/2018 | Underwood | ........... | F16M 13/02 |
| 2013/0280972 A1 * | 10/2013 | Cheung | ................... | E04H 4/143 441/129 |
| 2015/0292219 A1 * | 10/2015 | McKnett | ................. | E04H 4/143 4/504 |

* cited by examiner

*Primary Examiner* — Janie M Loeppke
(74) *Attorney, Agent, or Firm* — Kyle A. Fletcher, Esq.

(57) ABSTRACT

The inflatable pool divider is configured for use with a swimming pool. The inflatable pool divider is placed in the swimming pool such that each inflatable pool divider bifurcates the swimming pool into two regions called a swimming lane. The inflatable pool divider is a floating structure. The inflatable pool divider is an inflatable structure. The inflatable pool divider comprises a master bladder, a plurality of valves, a plurality of end caps, a plurality of tensioning devices, a plurality of carabiners, and a sleeve. The plurality of valves and the plurality of end caps attach to the master bladder. The plurality of tension devices and the plurality of carabiners anchor the plurality of end caps to the swimming pool.

18 Claims, 3 Drawing Sheets

INFLATABLE POOL DIVIDER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of fixed constructions including constructions for particular purposes such as pools, more specifically, a swimming lane marker for a pool. (E04H4/143)

SUMMARY OF INVENTION

The inflatable pool divider is configured for use with a swimming pool. The inflatable pool divider is placed in the swimming pool such that each inflatable pool divider bifurcates the swimming pool into two regions called a swimming lane. The inflatable pool divider is a floating structure. The inflatable pool divider is an inflatable structure. The inflatable pool divider comprises a master bladder, a plurality of valves, a plurality of end caps, a plurality of tensioning devices, a plurality of carabiners, and a sleeve. The plurality of valves and the plurality of end caps attach to the master bladder. The plurality of tension devices and the plurality of carabiners anchor the plurality of end caps to the swimming pool.

These together with additional objects, features and advantages of the inflatable pool divider will be readily apparent to those of ordinary skill in the art upon reading the following detailed description of the presently preferred, but nonetheless illustrative, embodiments when taken in conjunction with the accompanying drawings.

In this respect, before explaining the current embodiments of the inflatable pool divider in detail, it is to be understood that the inflatable pool divider is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the inflatable pool divider.

It is therefore important that the claims be regarded as including such equivalent construction insofar as they do not depart from the spirit and scope of the inflatable pool divider. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
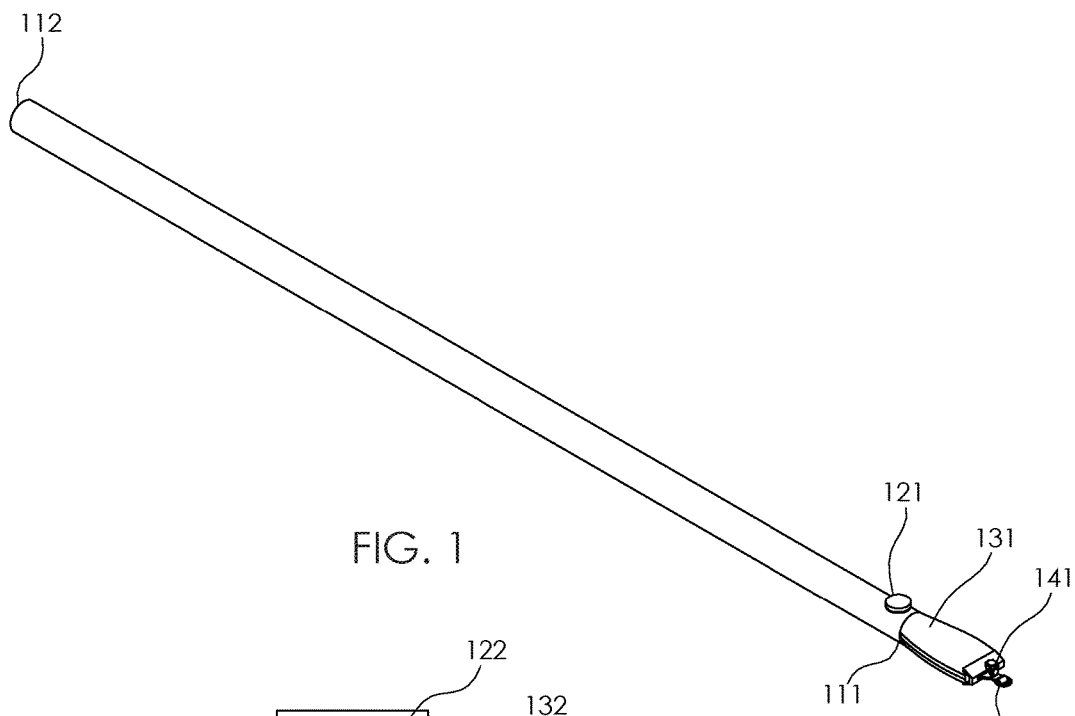
FIG. 1 is a perspective view of an embodiment of the disclosure.
Figure 2:
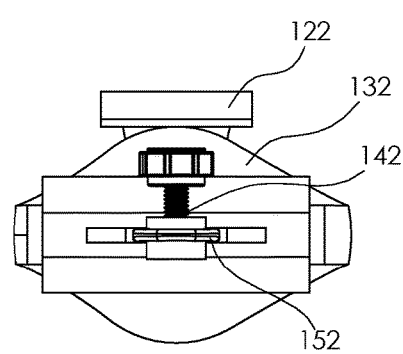
FIG. 2 is a side view of an embodiment of the disclosure.
Figure 3:
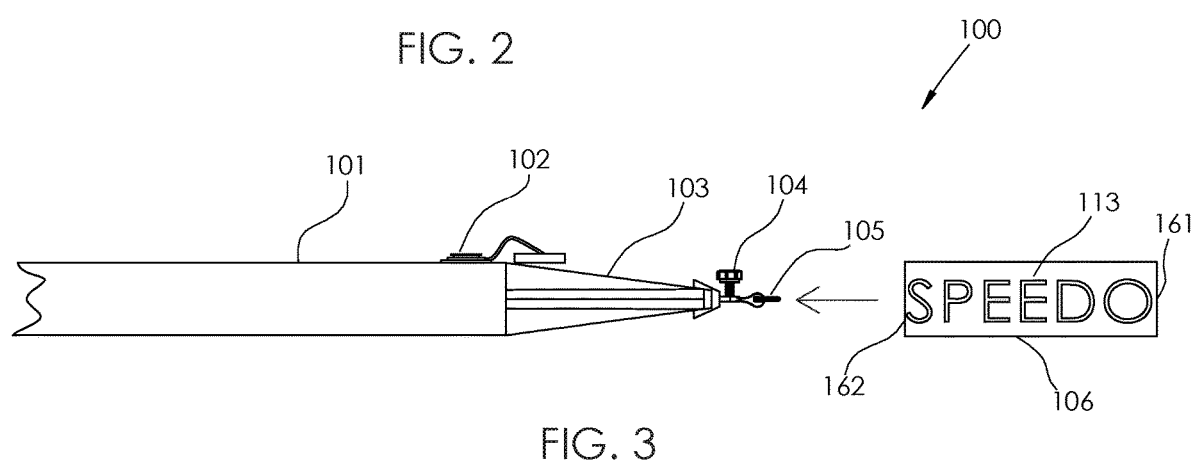
FIG. 3 is a front view of an embodiment of the disclosure.
Figure 4:
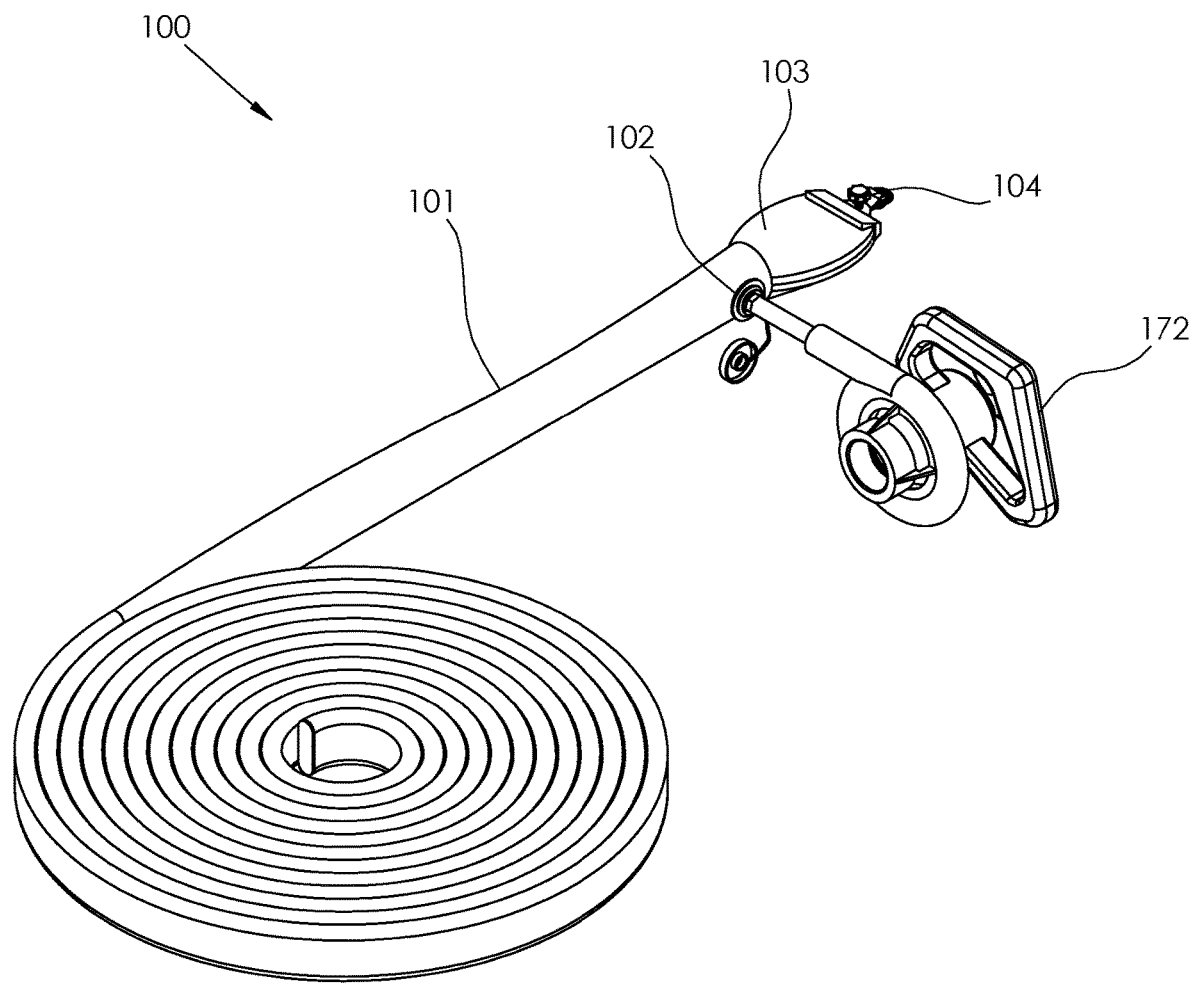
FIG. 4 is an in-use view of an embodiment of the disclosure.
Figure 5:
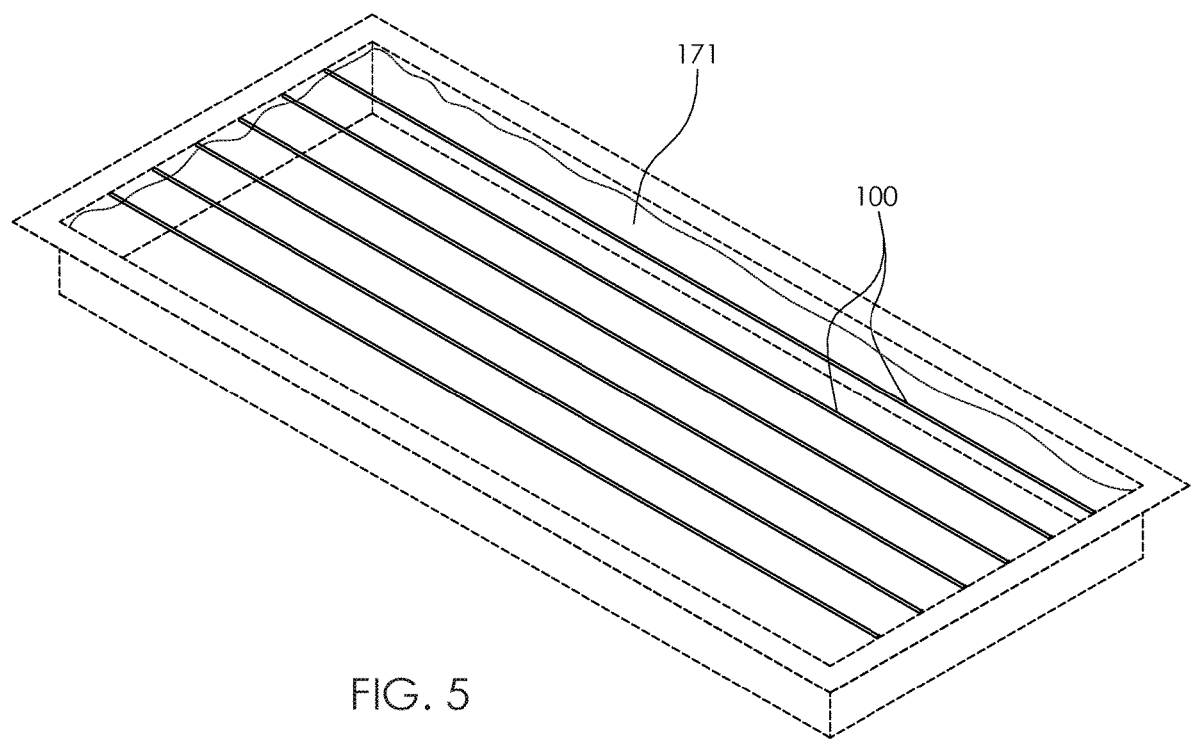
FIG. 5 is an in-use view of an embodiment of the disclosure.

Detailed reference will now be made to one or more potential embodiments of the disclosure, which are illustrated in FIGS. 1 through 5.

Detailed reference will now be made to one or more potential embodiments of the disclosure, which are illustrated in FIGS. 1 through 5.

The inflatable pool divider 100 (hereinafter invention) is configured for use with a swimming pool 171. The invention 100 is placed in the swimming pool 171 such that each invention 100 bifurcates the swimming pool 171 into two regions called a swimming lane. The invention 100 is a floating structure. The invention 100 is an inflatable structure. The invention 100 comprises a master bladder 101, a plurality of valves 102, a plurality of end caps 103, a plurality of tensioning devices 104, a plurality of carabiners, 105 and a sleeve 106. The plurality of valves 102 and the plurality of end caps 103 attach to the master bladder 101. The plurality of tensioning devices and the plurality of carabiners 105 anchor the plurality of end caps 103 to the swimming pool 171. The master bladder 101 inserts into the sleeve 106.

The master bladder 101 is a prism-shaped structure. The master bladder 101 is a hollow structure. The master bladder is formed as a hose. The master bladder 101 is a fluid impermeable structure. The master bladder 101 is a flexible structure. The master bladder 101 is an inflatable structure. The master bladder 101 is a floating structure. The master bladder 101 forms the structure that bifurcates the swimming pool 171 into swimming lanes. The volume of the master bladder 101 is adjustable. The volume of the master bladder 101 is adjusted by changing the pressure of the atmospheric gas contained within the master bladder 101.

The master bladder 101 is adjusted such that the master bladder 101 floats on the surface of the swimming pool 171. The master bladder 101 comprises a first master bladder 101 end 111, a second master bladder 101 end 112, and a master bladder 101 lateral face 113.

The first master bladder 101 end 111 is an open end of the hose structure of the master bladder 101. The second master bladder 101 end 112 is a second open end of the hose structure of the master bladder 101. The second master bladder 101 end 112 is the open end of the hose structure of the master bladder 101 that is distal from the first master bladder 101 end 111. The master bladder 101 lateral face 113 is a fluid impermeable structure that forms the lateral face of the prism structure that forms the hose structure of the master bladder 101.

Each of the plurality of valves 102 is a valve. Each of the plurality of valves 102 mounts in the master bladder 101. Each of the plurality of valves 102 forms a fluid impermeable seal with the master bladder 101. Each of the plurality of valves 102 forms a fluidic connection with a pump 172. The pump 172 is a mechanical device that generates a pressure differential that transports atmospheric gas under pressure into the master bladder 101. Each of the plurality of valves 102 forms the fluidic connection between the pump 172 and the master bladder 101 that allows the pump 172 to pressurize the master bladder 101. Each of the plurality of valves 102 reduces the volume of the master bladder 101 by releasing the pressurized gas contained within the master bladder 101.

The plurality of valves 102 comprises a first valve 121 and a second valve 122. The first valve 121 is the valve selected from the plurality of valves 102 that attaches to the master bladder 101 lateral face 113 of the master bladder 101 at a position proximal to the first master bladder 101 end 111. The first valve 121 forms a fluid impermeable seal with the master bladder 101 lateral face 113 of the master bladder 101. The second valve 122 is the valve selected from the plurality of valves 102 that attaches to the master bladder 101 lateral face 113 of the master bladder 101 at a position proximal to the second master bladder 101 end 112. The second valve 122 forms a fluid impermeable seal with the master bladder 101 lateral face 113 of the master bladder 101.

Each of the plurality of end caps 103 is a hollow structure. Each of the plurality of end caps 103 has the shape of a tapered prism structure. In the first potential embodiment of the disclosure, each of the plurality of end caps 103 has a wedge shape. Each of the plurality of end caps 103 is a fluid impermeable structure. Each of the plurality of end caps 103 is a flexible structure. Each of the plurality of end caps 103 is an inflatable structure. Each of the plurality of end caps 103 is a floating structure.

Each of the plurality of end caps 103 attaches to an end of the master bladder 101 selected from the group consisting of the first master bladder 101 end 111 and the second master bladder 101 end 112. Each of the plurality of end caps 103 attaches to the selected end of the master bladder 101 to form a composite prism structure. Each of the plurality of end caps 103 attaches to the selected end of the master bladder 101 such that each of the plurality of end caps 103 forms a gas impermeable seal with the master bladder 101 lateral face 113 of the master bladder 101.

Each of the plurality of end caps 103 forms an impermeable gas closure that encloses the hose structure of the master bladder 101. Each of the plurality of end caps 103 forms a mechanical structure that attaches a tensioning device selected from the plurality of tensioning devices 104 to the master bladder 101.

The plurality of end caps 103 comprises a first end cap 131 and a second end cap 132. The first end cap 131 is the end cap selected from the plurality of end caps 103 that encloses the first master bladder 101 end 111 of the master bladder 101. The second end cap 132 is the end cap selected from the plurality of end caps 103 that encloses the second master bladder 101 end 112 of the master bladder 101.

Each of the plurality of tensioning devices 104 is a mechanical structure. Each of the plurality of tensioning devices 104 attaches to the exterior surface of an end cap selected from the plurality of end caps 103. Each of the plurality of tensioning devices 104 is an adjustable structure. By adjustable structure is meant that the span of the length of each of the plurality of tensioning devices 104 can be adjusted. The span of the length of each of the plurality of tensioning devices 104 is adjusted in order to apply a tension to the master bladder 101 such that the master bladder 101 can be anchored into a fixed position. Each of the plurality of tensioning devices 104 is a locking device such that the span of the length of each of the plurality of tensioning devices 104 can be fixed in position.

Each of the plurality of tensioning devices 104 attaches a carabiner selected from the plurality of carabiners 105 to the selected end cap associated with the selected tensioning device. In the first potential embodiment of the disclosure, each of the plurality of tensioning devices 104 is a turnbuckle that is further fitted with a locking screw that locks the turnbuckle into a fixed position.

The plurality of tensioning devices 104 comprises a first tensioning device 141 and a second tensioning device 142. The first tensioning device 141 is the tensioning device selected from the plurality of tensioning devices 104 that attaches to the first end cap 131. The second tensioning device 142 is the tensioning device selected from the plurality of tensioning devices 104 that attaches to the second end cap 132.

Each of the plurality of carabiners 105 is a fastening structure known as a carabiner. The carabiner is defined elsewhere in this disclosure. Each of the plurality of carabiners 105 anchors a tensioning device selected from the plurality of tensioning devices 104 to an anchor point that is provisioned by the swimming pool 171.

The plurality of carabiners 105 comprises a first carabiner and a second carabiner 152. The first carabiner 151 is a carabiner selected from the plurality of carabiners 105 that attaches the first tensioning device 141 to an anchor point provisioned with the swimming pool 171. The second carabiner 152 is a carabiner selected from the plurality of carabiners 105 that attaches the second tensioning device 142 to an anchor point provisioned with the swimming pool 171.

The sleeve 106 is a prism-shaped structure. The sleeve 106 is a hollow structure. The sleeve 106 is formed as a hose. The span of the length of the inner diameter of the hose structure of the sleeve 106 is greater than the span of the length of the outer diameter of the hose structure of the master bladder 101 such that the master bladder 101 inserts through the sleeve 106. The sleeve 106 is configured to display an image. The image displayed by the sleeve 106 comprises indicia that are configured to convey a sentiment. The sleeve 106 comprises a first sleeve 106 end 161, a second sleeve 106 end 162, and a sleeve 106 lateral face 163.

The first sleeve 106 end 161 is an open end of the hose structure of the sleeve 106. The second sleeve 106 end 162 is a second open end of the hose structure of the sleeve 106. The second sleeve 106 end 162 is the open end of the hose structure of the sleeve 106 that is distal from the first sleeve 106 end 161. The sleeve 106 lateral face 163 is a fluid impermeable structure that forms the lateral face of the prism structure that forms the hose structure of the sleeve 106.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Anchor Point: As used in this disclosure, an anchor point is a location to which a first object can be securely attached to a second object.

Bladder: As used in this disclosure, a bladder is a fluid impermeable structure. The internal volume of the structure can be varied by: a) varying the pressure and/or quantity of a fluid contained within the bladder; or b) varying the quantity of a liquid contained within the bladder. Bladders are commonly used for storage of a fluid and as a cushion.

Buoyancy: As used in this disclosure, buoyancy refers to a property of an object that floats in a liquid. The object that floats in the liquid is referred to as buoyant. Buoyancy specifically refers to the situation where the mass of the liquid that is displaced when a buoyant object is placed in the liquid is greater than the mass of the object itself. In this instance, the pressure of the displaced liquid will raise the buoyant object such that the buoyant object floats.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Eyebolt: As used in this disclosure, an eyebolt is a bolt that is formed with a ring at one end. The ring is commonly referred to as an eyelet.

Flexible: As used in this disclosure, flexible refers to an object or material that will deform when a force is applied to it but that will not necessarily return to its original shape when the deforming force is removed.

Float: As used in this object, float refers to an object that is buoyant, or does not sink into, a liquid.

Fluid: As used in this disclosure, a fluid refers to a state of matter wherein the matter is capable of flow and takes the shape of a container it is placed within. The term fluid commonly refers to a liquid or a gas.

Fluidic Connection: As used in this disclosure, a fluidic connection refers to a tubular structure that transports a fluid from a first object to a second object. Methods to design and use a fluidic connection are well-known and Form Factor: As used in this disclosure, the term form factor refers to the size and shape of an object.

Force: As used in this disclosure, a force refers to a net (or unopposed) measurable interaction that changes the direction of motion of an object, the velocity of motion of an object, the momentum of an object, or the stress within an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Hose: As used in this disclosure, a hose is a flexible hollow prism-shaped device that is used for transporting liquids and gases. When referring to a hose in this disclosure, the terms inner dimension and outer dimension are used as they would be used by those skilled in the plumbing arts.

Image: As used in this disclosure, an image is an optical representation or reproduction of an indicia or of the appearance of something or someone. See indicia sentiment optical character recognition.

Indicia: As used in this disclosure, the term indicia refers to a set of markings that identify a sentiment.

Inflatable Structure: As used in this disclosure, an inflatable structure is a fluid impermeable semi-rigid structure that is configured to contain a gas under pressure. The volume of the containment space formed by the inflatable structure is a function of the pressure differential between the pressure of the gas contained within the inflatable structure and the pressure of the exterior gas surrounding the inflatable structure.

Inflation: As used in this disclosure, inflation refers to filling the interior of an enclosed fluid impermeable semi-rigid structure with gas at a pressure greater than the exterior gas pressure of the enclosed fluid impermeable semi-rigid structure. The infinitive of the verbal form for inflation is to inflate.

Inner Dimension: As used in this disclosure, the term inner dimension describes the span from a first inside or interior surface of a container to a second inside or interior surface of a container. The term is used in much the same way that a plumber would refer to the inner diameter of a pipe.

Liquid: As used in this disclosure, a liquid refers to a state (phase) of matter that is fluid and that maintains, for a given pressure, a fixed volume that is independent of the volume of the container.

Major and Minor Axes: As used in this disclosure, the major and minor axes refer to a pair of perpendicular axes that are defined within a structure. The length of the major axis is always greater than or equal to the length of the minor axis. The major axis forms the longest symmetric bifurcation of the structure. The major and minor axes intersect at the center of the structure. The major axis is always parallel or perpendicular to an edge of a rectangular or rectilinear structure.

Negative Space: As used in this disclosure, negative space is a method of defining an object through the use of open or empty space as the definition of the object itself, or, through the use of open or empty space to describe the boundaries of an object.

Normal Temperature and Pressure: As used in this disclosure, normal temperature and pressure refers to gas storage conditions corresponding to 20 degrees C. at 100 kPa (approx. 1 atmosphere). Normal temperature and pressure is often abbreviated as NTP.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Perimeter: As used in this disclosure, a perimeter is one or more curved or straight lines that bounds an enclosed area on a plane or surface. The perimeter of a circle is commonly referred to as a circumference.

Pool: As used in this disclosure, a pool is a self-contained body of water. By self-contained is meant that fluidic connections between the pool and the other bodies of water do not result in a significant change or difference in the water volume contained in the pool over a 24 hour period.

Pressure: As used in this disclosure, pressure refers to a measure of force per unit area.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pump: As used in this disclosure, a pump is a mechanical device that uses suction or pressure to raise or move fluids, compress fluids, or force a fluid into an inflatable object. Within this disclosure, a compressor refers to a pump that is dedicated to compressing a fluid or placing a fluid under pressure.

Ring: As used in this disclosure, a ring is term that is used to describe a disk-like structure through which a negative space is formed. Rings are often considered loops.

Roughly: As used in this disclosure, roughly refers to a comparison between two objects. Roughly means that the difference between one or more parameters of the two compared objects are not significantly different.

Sentiment: As used in this disclosure, a sentiment refers to a symbolic meaning or message that is communicated through the use of an image, potentially including a text based image.

Sleeve: As used in this disclosure, a sleeve is a tube like covering that is placed over a rod, shaft or other cylindrical object.

Taper: As used in this disclosure, a taper is a continuous and typically, but not necessarily gradual, change in the span of the length of a structure in the direction parallel a direction selected from the group selected from the major axis and the minor axis of the structure. The change in the span of the length occurs as an apparent function of the measurement position along the unselected axis of the object.

Tapered Prism Structure: As used in this disclosure, a tapered prism structure is a modified prism structure that is formed such that the first congruent end of the modified prism structure is geometrically similar to, but not geometrically identical to the second congruent end of the modified prism. The span of the length of a radial line from the center axis to the lateral face of the modified prism structure will vary as a function of its position along the center axis. Always use taper.

Tension: As used in this disclosure, tension refers to a force applied to an object such that the force will stretch the span of length of the object along the direction of the force.

Turnbuckle: As used in this disclosure, a turnbuckle is a hardware item that comprises two eyebolts and a metal frame. The two eyebolts screw into the metal frame. The turnbuckle is used to: a) adjusts the tension on a cord; or, b) adjust the overall span of the length between the eyelets of the two eyebolts.

Valve: As used in this disclosure, a valve is a device that is used to control the flow of a fluid (gas or liquid) through a pipe, tube, or hose.

Wedge: As used in this disclosure, a wedge is a modification to a prism-shaped structure wherein: a) the span of the distance of the diameter varies continuously as a function of the position of the center axis of the prism; and, b) the two congruent ends of the prism structure remain geometrically similar. A blade is a wedge-like structure that ultimately forms a cutting edge. This disclosure considers a wedge to be a type of tapered prism structure.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An inflatable pool divider comprising
a master bladder, a plurality of valves, a plurality of end caps, a plurality of tensioning devices, a plurality of carabiners, and a sleeve;
wherein the plurality of valves and the plurality of end caps attach to the master bladder;
wherein the inflatable pool divider is configured for use with a swimming pool;
wherein the inflatable pool divider is placed in the swimming pool such that each inflatable pool divider bifurcates the swimming pool into two regions called swimming lanes;
wherein each of the plurality of valves forms a fluidic connection with a pump;
wherein the pump is a mechanical device that generates a pressure differential that transports atmospheric gas under pressure into the master bladder;
wherein each of the plurality of valves forms the fluidic connection between the pump and the master bladder that allows the pump to pressurize the master bladder;
wherein each of the plurality of valves further reduces the volume of the master bladder by releasing the pressurized gas contained within the master bladder;
wherein each of the plurality of end caps is a hollow structure;
wherein each of the plurality of end caps has the shape of a tapered prism structure.

2. The inflatable pool divider according to claim 1
wherein the inflatable pool divider is a floating structure;
wherein the inflatable pool divider is an inflatable structure;
wherein the plurality of tensioning devices and the plurality of carabiners anchor the plurality of end caps to the swimming pool;
wherein the master bladder inserts into the sleeve;
wherein master bladder is a prism-shaped structure;
wherein the master bladder is a hollow structure;
wherein the master bladder is formed as a hose;
wherein the master bladder is a fluid impermeable structure;
wherein the master bladder is a flexible structure;
wherein the master bladder is an inflatable structure;
wherein the master bladder is a floating structure.

3. The inflatable pool divider according to claim 2
wherein the master bladder forms the structure that bifurcates the swimming pool into swimming lanes;
wherein the volume of the master bladder is adjustable;
wherein the volume of the master bladder is adjusted by changing the pressure of the atmospheric gas contained within the master bladder;
wherein the master bladder is adjusted such that the master bladder floats on the surface of the swimming pool.

4. The inflatable pool divider according to claim 3
wherein each of the plurality of valves is a valve;
wherein each of the plurality of valves mounts in the master bladder;
wherein each of the plurality of valves forms a fluid impermeable seal with the master bladder.

5. The inflatable pool divider according to claim 4
wherein each of the plurality of end caps is a fluid impermeable structure;
wherein each of the plurality of end caps is a flexible structure;
wherein each of the plurality of end caps is an inflatable structure;
wherein each of the plurality of end caps is a floating structure;
wherein each of the plurality of end caps forms an impermeable gas closure that encloses the hose structure of the master bladder;
wherein each of the plurality of end caps forms a mechanical structure that attaches a tensioning device selected from the plurality of tensioning devices to the master bladder.

6. The inflatable pool divider according to claim 5
wherein each of the plurality of tensioning devices is a mechanical structure;
wherein each of the plurality of tensioning devices attaches to the exterior surface of an end cap selected from the plurality of end caps.

7. The inflatable pool divider according to claim 6
wherein each of the plurality of tensioning devices is an adjustable structure;
wherein by adjustable structure is meant that the span of the length of each of the plurality of tensioning devices is adjustable;
wherein the span of the length of each of the plurality of tensioning devices is adjusted to fix the position of the master bladder in the swimming pool.

8. The inflatable pool divider according to claim 7
wherein each of the plurality of tensioning devices is a locking device such that the span of the length of each of the plurality of tensioning devices is fixed in position;
wherein each of the plurality of tensioning devices attaches a carabiner selected from the plurality of carabiners to the selected end cap associated with the selected tensioning device.

9. The inflatable pool divider according to claim 8
wherein each of the plurality of carabiners is a fastening structure known as a carabiner;
wherein each of the plurality of carabiners anchors a tensioning device selected from the plurality of tensioning devices to an anchor point that is provisioned by the swimming pool.

10. The inflatable pool divider according to claim 9
wherein each sleeve is a prism-shaped structure;
wherein the sleeve is a hollow structure;
wherein the sleeve is formed as a hose;
wherein the span of the length of the inner diameter of the hose structure of the sleeve is greater than the span of the length of the outer diameter of the hose structure of the master bladder such that the master bladder inserts through the sleeve;
wherein the sleeve is configured to display an image;
wherein the image displayed by the sleeve comprises indicia that are configured to convey a sentiment.

11. The inflatable pool divider according to claim 10
wherein the master bladder comprises a first master bladder end, a second master bladder end, and a master bladder lateral face;
wherein the first master bladder end is an open end of the hose structure of the master bladder;
wherein the second master bladder end is a second open end of the hose structure of the master bladder;
wherein the second master bladder end is the open end of the hose structure of the master bladder that is distal from the first master bladder end;
wherein the master bladder lateral face is a fluid impermeable structure that forms the lateral face of the prism structure that forms the hose structure of the master bladder.

12. The inflatable pool divider according to claim 11
wherein the plurality of valves comprises a first valve and a second valve;
wherein the first valve is the valve selected from the plurality of valves that attaches to the master bladder lateral face of the master bladder at a position proximal to the first master bladder end;
wherein the first valve forms a fluid impermeable seal with the master bladder lateral face of the master bladder;
wherein the second valve is the valve selected from the plurality of valves that attaches to the master bladder lateral face of the master bladder at a position proximal to the second master bladder end;
wherein the second valve forms a fluid impermeable seal with the master bladder lateral face of the master bladder.

13. The inflatable pool divider according to claim 12
wherein each of the plurality of end caps has a wedge shape.

14. The inflatable pool divider according to claim 13
wherein each of the plurality of end caps attaches to an end of the master bladder selected from the group consisting of the first master bladder end and the second master bladder end;
wherein each of the plurality of end caps attaches to the selected end of the master bladder to form a composite prism structure;
wherein each of the plurality of end caps attaches to the selected end of the master bladder such that each of the plurality of end caps forms a gas impermeable seal with the master bladder lateral face of the master bladder.

15. The inflatable pool divider according to claim 14
wherein the plurality of end caps comprises a first end cap and a second end cap;
wherein the first end cap is the end cap selected from the plurality of end caps that encloses the first master bladder end of the master bladder;
wherein the second end cap is the end cap selected from the plurality of end caps that encloses the second master bladder end of the master bladder.

16. The inflatable pool divider according to claim 15
wherein the plurality of tensioning devices comprises a first tensioning device and a second tensioning device;
wherein the first tensioning device is the tensioning device selected from the plurality of tensioning devices that attaches to the first end cap;
wherein the second tensioning device is the tensioning device selected from the plurality of tensioning devices that attaches to the second end cap.

17. The inflatable pool divider according to claim 16
wherein the plurality of carabiners comprises a first carabiner and a second carabiner;
wherein the first carabiner is a carabiner selected from the plurality of carabiners that attaches the first tensioning device to an anchor point provisioned with the swimming pool;
wherein the second carabiner is a carabiner selected from the plurality of carabiners that attaches the second tensioning device to an anchor point provisioned with the swimming pool.

18. The inflatable pool divider according to claim 17
wherein the sleeve comprises a first sleeve end, a second sleeve end, and a sleeve lateral face;
wherein the first sleeve end is an open end of the hose structure of the sleeve;
wherein the second sleeve end is a second open end of the hose structure of the sleeve;
wherein the second sleeve end is the open end of the hose structure of the sleeve that is distal from the first sleeve end;
wherein the sleeve lateral face is a fluid impermeable structure that forms the lateral face of the prism structure that forms the hose structure of the sleeve.

* * * * *